No. 728,259. PATENTED MAY 19, 1903.
A. D. LUNT.
SYSTEM OF ELECTRICAL DISTRIBUTION.
APPLICATION FILED NOV. 30, 1900.
NO MODEL.

Witnesses:
Lewis P. Abell.
Benjamin B. Hull.

Inventor:
Alexander D. Lunt,
by Albert G. Davis.
Atty.

No. 728,259. Patented May 19, 1903.

UNITED STATES PATENT OFFICE.

ALEXANDER D. LUNT, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 728,259, dated May 19, 1903.

Application filed November 30, 1900. Serial No. 38,087. (No model.)

*To all whom it may concern:*

Be it known that I, ALEXANDER D. LUNT, a citizen of the United States, residing at Schenectady, county of Schenectady, State of New York, have invented certain new and useful Improvements in Systems of Electrical Distribution, of which the following is a specification.

My present invention relates to certain improvements of particular value in connection with that type of dynamo-electric machine which is adapted to receive current from or deliver current to either an alternating-current system or a direct-current system, an example of which type of machine is represented by the well-known rotary converter. My invention when applied to such a machine largely reduces the heating of the armature-conductors and at the same time improves the commutation of the machine, thereby increasing the output and improving the efficiency of the machine. As the best means for explaining my invention I have hereinafter described the same as applied to a twelve-phase rotary converter for changing alternating current into direct current, or the reverse, as may be desired; but it is to be understood that it is not to be limited to use in this connection alone.

As to the points of novelty which characterize my invention, the claims appended hereto are intended to clearly point out the same.

Figure 1:
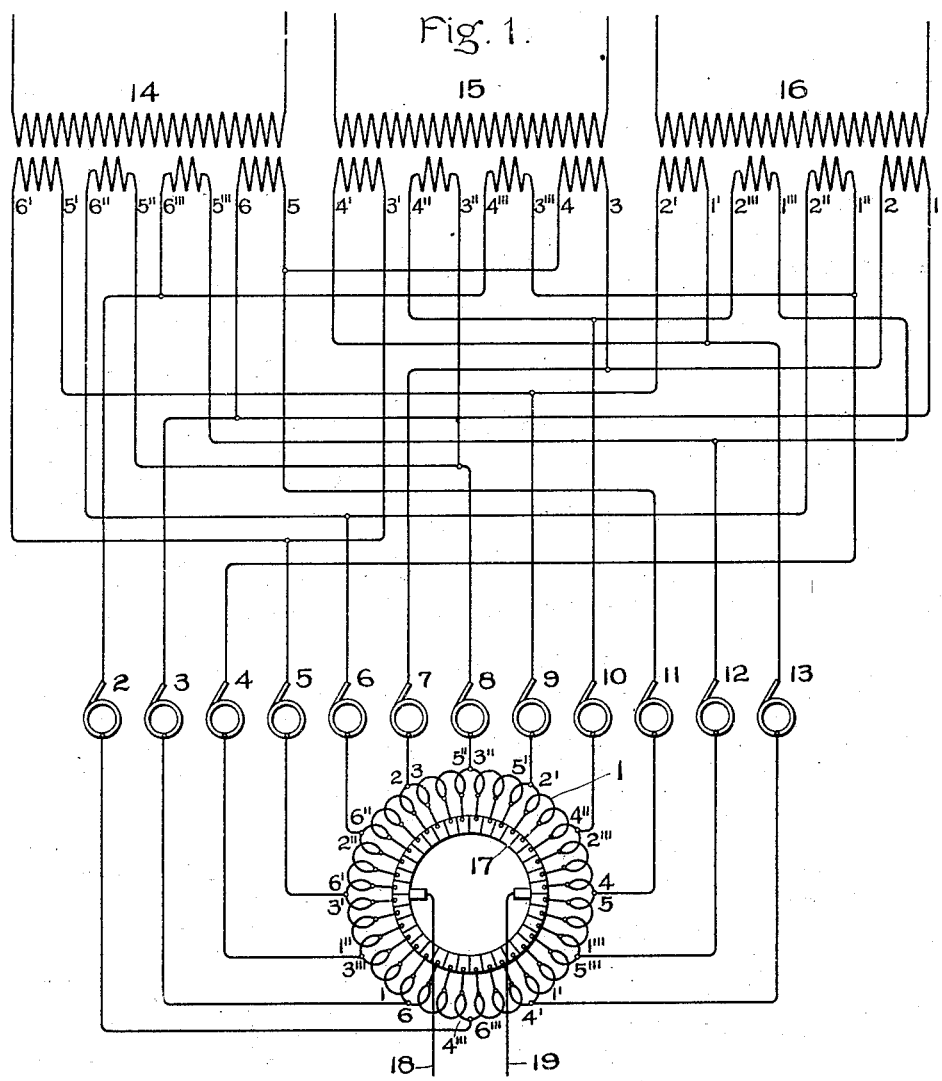
Figure 2:
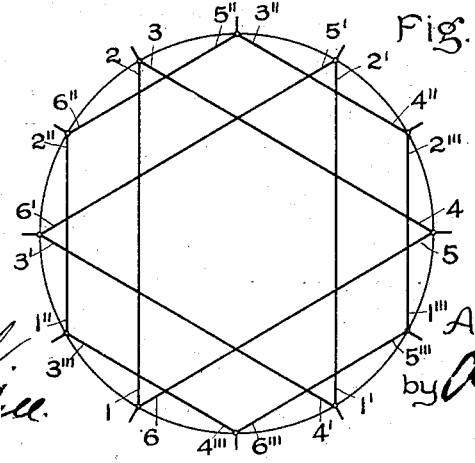

In the drawings, Figure 1 is a diagrammatic representation of my invention, and Fig. 2 an explanatory diagram of electromotive forces.

Fig. 1 represents, among other features, a system of connections whereby three-phase current may be converted into twelve-phase current and supplied to the armature of a dynamo-electric machine, the conversion being effected through the instrumentality of a system of transformers the windings of which are interconnected, so as to form three distinct polygons of electromotive forces, two of the polygons representing a triangular relation of electromotive forces and the third a connection of electromotive forces in such a way that they may be represented by a hexagon. These various relations of electromotive forces will be made clearer by reference to Fig. 2, which upon inspection will be seen to disclose a triangle the ends of the sides of which are numbered from 1 to 6, successively, a reversely-arranged triangle, (numbered from 1' to 6', inclusive,) the remaining figure being a hexagon the sides of which are indicated by the numerals in this figure not already referred to. The various angles of these polygons will be seen to intersect the circumscribing circle at twelve points equally spaced from each other. These points of intersection are represented in Fig. 1 by the taps connected to correspondingly-designated points in the armature-winding 1 of the rotary converter therein shown. These taps are connected to a series of collector-rings 2 to 13, inclusive, by means of which current is conveyed either to or from the armature-winding 1, the collector-rings in turn being connected to a system of transformers in which the electromotive forces have the relations represented in the diagram in Fig. 2. To make clear these connections, the various taps about the armature-winding 1 are designated by pairs of numerals identical with the numerals applied to designate the ends of the transformer-windings to which these taps lead. The transformer-windings to which reference has thus been made consist of three sets of secondary windings, each set comprising four secondaries inductively related to a single primary. These primary windings are indicated at 14, 15, and 16 and are connected in any suitable manner to a three-phase supply-circuit. The sets of secondaries corresponding to these primaries are connected together, so that their electromotive forces are interrelated, in a manner represented by the diagram in Fig. 2, it being understood, of course, that the several secondaries are so proportioned as to give electromotive forces of the relative values represented by the lengths of the sides of the various polygons in Fig. 2. Upon this understanding the connections will now be pointed out.

As a basis for making the connections shown three secondaries are selected—one from each set—and are connected in delta relation in an ordinary manner, the selection being made arbitrarily from the various secondaries constituting each set. The secondaries selected in this particular case are numbered 1, 2, 3, 4, 5, and 6, the connections being made so that the closed circuit constituting the delta connection includes the windings in the order in which the numerals are given. This connection of secondaries is represented by the correspondingly-designated triangle in Fig. 2. The next step is to connect up three more secondaries, so as to produce a relation of electromotive forces represented by the second triangles 1' to 6', inclusive, which forms with the first what may be termed a "double" delta. The parallel sides of these reversely-arranged deltas are designated by the same numerals, but are distinguished from each other by a suitable exponent—as, for example, the exponent '. The sides of the two triangles being thus numbered, so that corresponding ends of parallel sides are represented by the same numerals suitably distinguished from each other, no difficulty will now be found in connecting up a set of transformer-secondaries to represent the second triangle, the connections in this case being of course made so that the circuit passes through the windings in the order in which the numerals are placed on the second triangle in Fig. 2— that is to say, in the order 1' 2' 5' 6' 3' 4'—it being understood, of course, that corresponding terminals of each of the secondaries constituting a set are represented by the same numeral as a basis, these numerals, however, being distinguished from each other, as above mentioned, by means of suitable exponents or otherwise. The connections for the triangle last mentioned may thus be readily traced in Fig. 1 without further explanation. The connections between the remaining transformer-secondaries are such as to include them in six-phase relation to each other, as represented by the hexagon described within the circle in Fig. 2. As a convenience in making these connections the diagram in Fig. 2 may serve as a guide. In this diagram the sides of the hexagon are numbered, so that the ends of each side are designated by characters having the same basic numeral as is applied to the corresponding ends of the sides of the triangles parallel thereto. Thus, for example, the triangle 1 to 6, inclusive, has the side 1 2 parallel to the side 1'' 2'' of the hexagon. The side 3 4 of this triangle corresponds in phase to the side 3'' 4'' for the hexagon, and so on. Inasmuch as the parallel sides of the various polygons in Fig. 2 correspond to secondaries of the same phase, no difficulty will now be had in making the proper connections to obtain the hexagonal relation of electromotive forces in Fig. 2, these connections being made such that the closed circuit resulting includes the secondaries in the order of the numerals applied to designate the same. Thus, for example, the circuit may be considered as starting at the terminal 1'' of the secondary thus designated in Fig. 1, then through this secondary to the other terminal 2'', then through secondray 6'' 5'', then through the secondary 3'' 4'', and so on.

From points in the connections which interlink the various secondaries in the manner described leads extend to and make contact with the corresponding collector-rings 2 to 13, inclusive, as will readily be understood. The collector-ring 2, for example, leads from the point designated 4''' 6''' in the armature-winding to the connection which joins together the similarly-designated ends of the transformer-secondaries which coöperated with the winding. In the arrangement thus described it is to be observed that the currents which circulate in the transformer-windings are in phase with the electromotive forces induced therein, and are therefore of minimum value, which condition would not be the case if the currents were out of phase with the electromotive forces of the windings. This arrangement therefore permits the employment of a minimum amount of copper, securing decreased cost and increased efficiency. Another valuable advantage is the cross connection between the various points of the armature-winding afforded by the various secondaries connected thereto. This cross connection serves to balance the electromotive forces acting about the armature-winding, thereby preventing large and useless cross-currents in the armature-winding, and so securing better commutation, which is an important matter in machines of this character.

It is of course to be understood that the rotary converter, the armature-winding of which is indicated at 1, is to be provided with the usual commutator 17 and with a properly-arranged field-magnet structure, which for the present purpose it has not been found necessary to illustrate. The direct-current mains 18 19 are connected to brushes which bear upon the commutator 17 in the ordinary manner.

What I claim as new, and desire to secure by Letters Patent of the United States, is—

1. The combination of a plurality of transformer-windings inductively related to a three-phase circuit, connections such as to interlink some of the windings in double-delta relation to each other, and connections between other windings interlinking them in closed circuit so that the electromotive forces between their terminals bear a six-phase relation to each other.

2. A dynamo-electric machine, a set of transformer-windings connected together so that the terminal electromotive forces have a six-phase relation to each other, other sets of transformer-windings with the terminal electromotive forces also in six-phase relation to each other, the electromotive forces of one set however being displaced in phase from the electromotive forces of the other, and connections between said machine and said transformer-windings.

3. The combination of a dynamo-electric machine, three sets of transformer-windings, the windings of each set being connected in closed circuit, and leads extending from points in the connections which interlink the windings of each set to points symmetrically located in a winding of said dynamo-electric machine.

4. A dynamo-electric machine, six transformer-windings connected in series with each other, and connections between the terminals of the six windings and said dynamo-electric machine.

5. The combination of three sets of transformer-windings, each set consisting of windings arranged in closed circuit, and operative connections between a dynamo-electric machine and said sets of transformer-windings.

6. A twelve-phase dynamo-electric machine, and leads extending from said machine and connected to three sets of sources of electromotive force, each set including a plurality of sources.

7. A dynamo-electric machine, a set of transformer-windings connected together so that the terminal electromotive forces have a six-phase relation to each other, other transformer-windings connected in double-delta relation to each other, and connections between said transformer-windings and said dynamo-electric machine.

8. The combination of sources of electromotive force connected in double-delta relation to each other, other sources of electromotive force connected in series so as to produce resultant six-phase electromotive forces, and a dynamo-electric machine operatively connected to said sources.

9. The combination of three distinct sets of windings, connections interlinking each of said sets in a closed circuit, a dynamo-electric machine, and connections from terminals of said windings to points symmetrically located in the armature-winding of said dynamo-electric machine.

10. The combination of a plurality of windings some of one electromotive force and some of a different electromotive force, connections interlinking windings of like electromotive force in closed circuit, other connections interlinking windings of electromotive forces differing in magnitude from the electromotive forces of the first set of windings, and a dynamo-electric machine having its armature connected to terminals of said windings.

11. The combination of a plurality of windings, connections interlinking a given number of the windings in closed circuit, other connections interlinking a different number of said windings in closed circuit, a dynamo-electric machine, and electrical connections from symmetrically-located points in a winding of said dynamo-electric machine to terminals of said windings.

12. The combination of a dynamo-electric machine having an armature provided with a commutator and collector-rings, a plurality of transformer-windings, connections between said windings interlinking them in a single closed circuit so that the electromotive forces between the terminals of the windings as thus connected bear a six-phase relation to each other, and connections between said terminals and said collector-rings.

13. The combination of a dynamo-electric machine, a plurality of transformer-windings, connections between some of the windings interlinking them in a closed circuit so that the electromotive forces between their terminals bear a six-phase relation to each other, and connections or leads extending from all of said windings to points symmetrically located in a winding of said dynamo-electric machine.

14. The combination of six windings connected in series with each other, means for developing in said windings alternating electromotive forces related to each other in phase like the sides of a hexagon, and a dynamo-electric machine having alternating current-leads connected to the junctions between said windings.

15. The combination of a dynamo-electric machine having leads extending from a winding thereof in six-phase relation to each other, six transformer-windings connected in series with each other, and connections between said leads and the six junctions between said transformer-windings.

In witness whereof I have hereunto set my hand this 28th day of November, 1900.

ALEXANDER D. LUNT.

Witnesses:
BENJAMIN B. HULL,
MARGARET E. WOOLLEY.